No. 842,723. PATENTED JAN. 29, 1907.
A. P. SWITZER.
TABLE.
APPLICATION FILED FEB. 2, 1906.
2 SHEETS—SHEET 1.
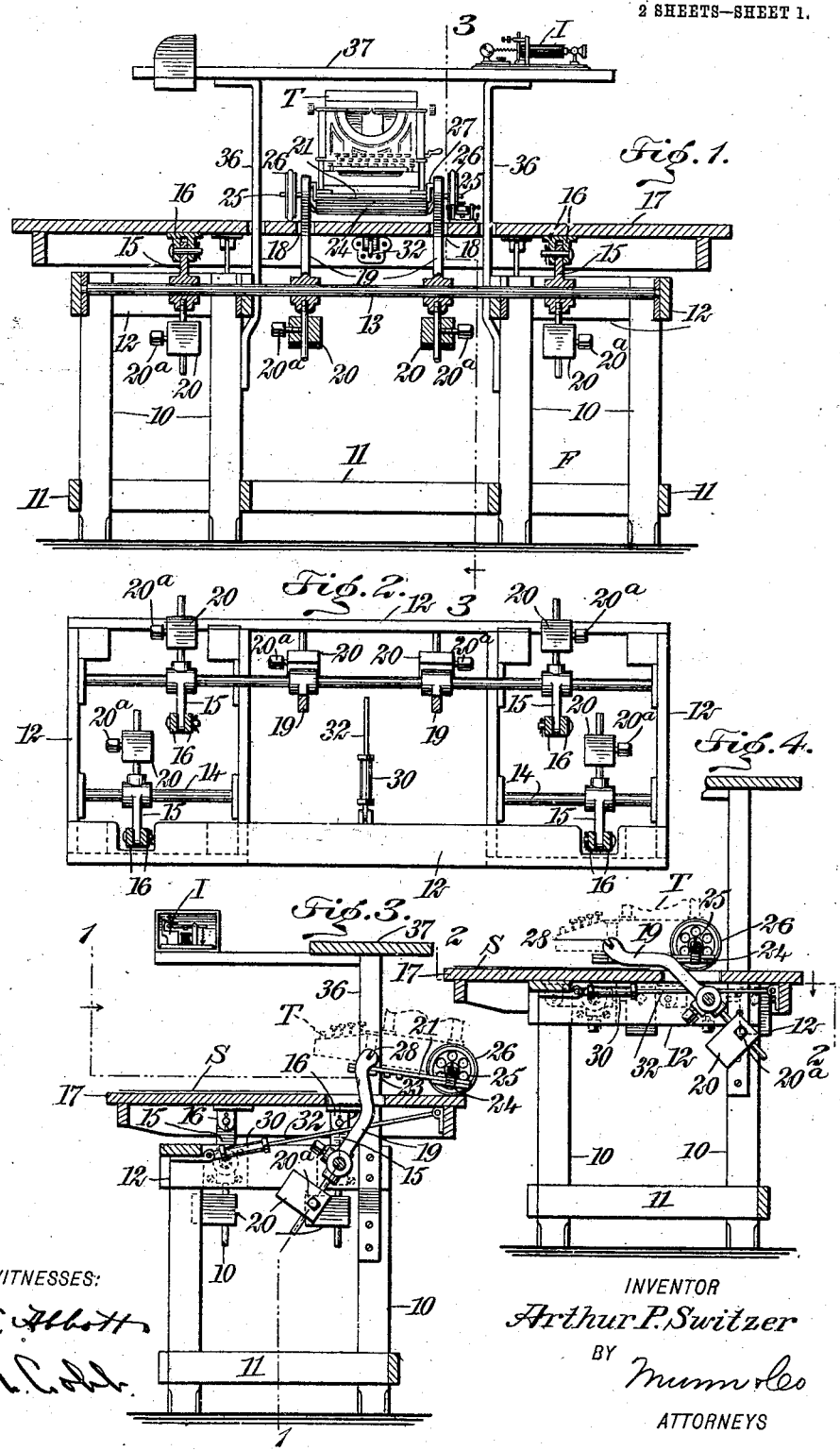
WITNESSES:
INVENTOR
Arthur P. Switzer
BY
Munn & Co
ATTORNEYS No. 842,723. PATENTED JAN. 29, 1907.
A. P. SWITZER.
TABLE.
APPLICATION FILED FEB. 2, 1906.
2 SHEETS—SHEET 2.
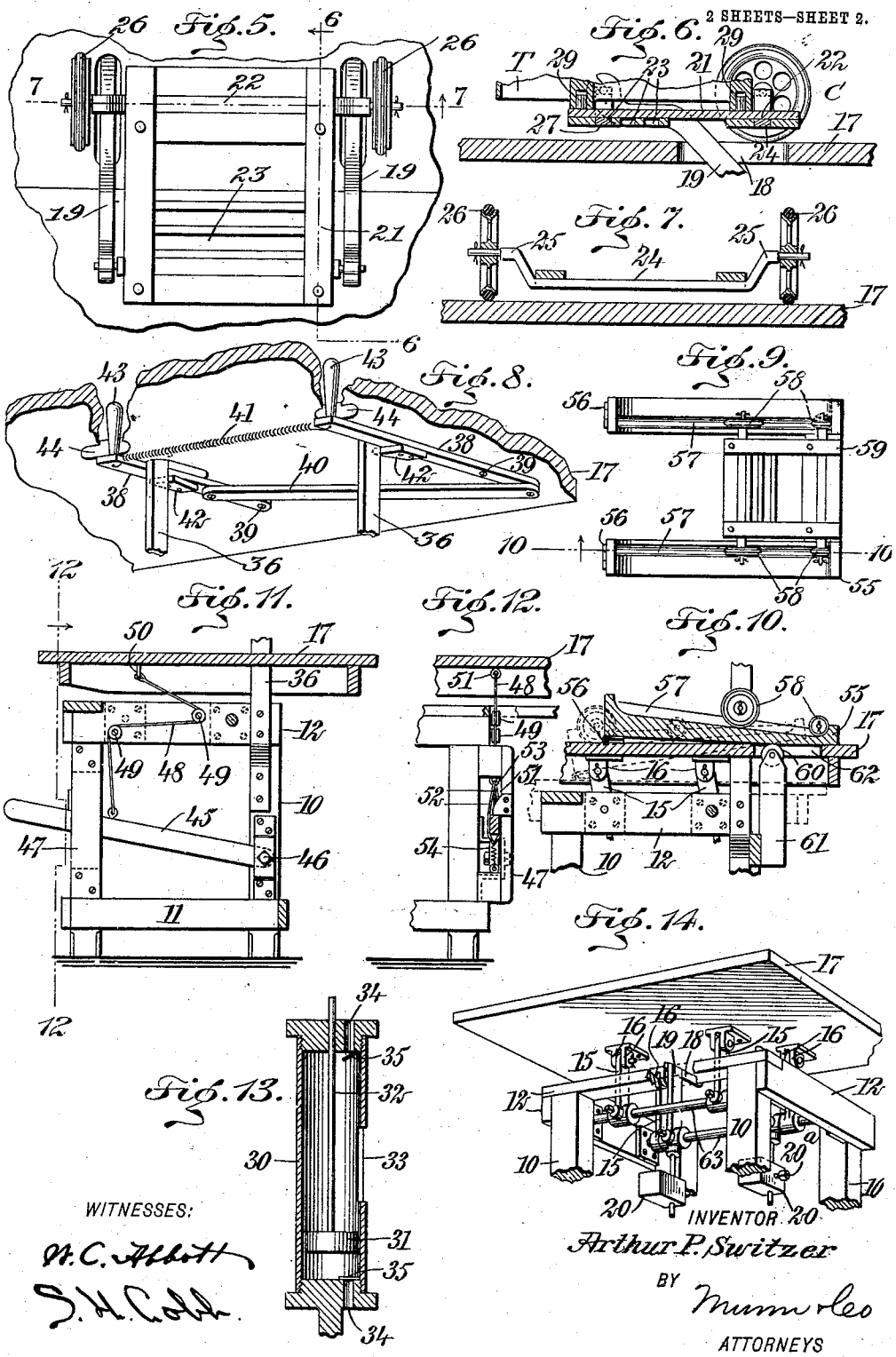
WITNESSES:
N. C. Abbott
S. H. Cobb
INVENTOR
Arthur P. Switzer
BY
Munn & Co
ATTORNEYS

UNITED STATES PATENT OFFICE.

ARTHUR P. SWITZER, OF NEW YORK, N. Y.

TABLE.

No. 842,723.      Specification of Letters Patent.      Patented Jan. 29, 1907.

Application filed February 2, 1906. Serial No. 299,146.

*To all whom it may concern:*

Be it known that I, ARTHUR P. SWITZER, a citizen of the United States, and a resident of the city of New York, borough of Manhattan, in the county and State of New York, have invented a new and Improved Table, of which the following is a full, clear, and exact description.

My invention relates to tables, and especially to those adapted for the support of such machines as type-writers. Its principal objects are to provide a table which may either hold the machine in position for use by the operator or which may be shifted with minimum effort to leave the forward portion of the table-top free for other purposes.

The table is especially useful for train-despatchers who use type-writing machines, as it enables the type-writer to be brought quickly into position or to be thrown back when desired, so as to allow the operator to use the train-sheet.

Reference is to be had to the accompanying drawings, forming a part of this specification, in which similar characters of reference indicate corresponding parts in all the views.

Figure 1 is a vertical longitudinal section through one embodiment of my invention, it being taken on the line 1 1 of Fig. 3. Fig. 2 is a horizontal section on the line 2 2 of Fig. 4. Fig. 3 is a transverse vertical section on the line 3 3 of Fig. 1, showing the machine in its inactive position. Fig. 4 is a similar view with the machine ready for use. Fig. 5 is a top plan view of the carriage and adjacent portion of the table-top. Fig. 6 is a section on the line 6 6 of Fig. 5. Fig. 7 is a similar view on the line 7 7 of Fig. 5. Fig. 8 is a perspective view of the under side of the table-top, illustrating locking mechanism therefor. Fig. 9 is a top plan view of another form of support with the coöperating carriage. Fig. 10 is a section on the line 10 10 of Fig. 9. Fig. 11 is a vertical transverse section of a table, to which is applied mechanism for effecting its movement. Fig. 12 is a section therethrough on the line 12 12 of Fig. 11. Fig. 13 is a longitudinal sectional detail through the cushioning-cylinder, and Fig. 14 is a perspective view of another form of table embodying my invention.

I have here illustrated the frame F of my improved table, comprising legs 10, between which are upper and lower connecting-bars 11 and 12, respectively. In the upper bars is journaled a rear shaft 13 and a forward shaft, preferably formed in separated alined sections 14 14, this division preventing interference with the knees of the user. Fixed to the shafts are pairs of arms 15 15, which at their upper extremities are articulated to pairs of lugs 16 16, depending from the under side of a table-top 17. The relation of the elements is such that when the arms occupy vertical positions, as shown in Fig. 3 of the drawings, the top will be substantially symmetrical with respect to the frame and will be at such a height that it will be convenient for ordinary use. When the arms are moved into forwardly-inclined positions, as illustrated in Fig. 4, with the top in contact with the frame, the forward edge of the former will overhang said frame, bringing it and any object upon it nearer to the user without change in his location. In the table-top near its rear portion and at each side of the center are slots 18, through which project supporting-arms 19, fast upon the shaft 13 between the arms 15. These arms 19 when the top is raised will extend in a vertical direction through the slots, their upper ends lying at some distance above its upper face. When the top is down, they will occupy their extreme forward positions, with their ends adjacent to the upper face. Each of the arms 15 and 19 preferably carries below the shaft a counterweight 20, shown as having a greater portion of its bulk upon one side of the supporting-arm than the other and secured in place by set-screws $20^a$. The weight of the members 20 is such that they may counterpoise both the top and the machine coöperating with the supports, and by their rotary adjustment about the arms this weight may be distributed so that its effect will be in either direction or will practically balance the associated elements. Movable above the table is a carriage C, having a platform 21, provided at the rear of its under side with a transverse slot 22 and in its forward portion with a series of similar slots 23. The slot 22 receives an axle 24, upon the upturned ends 25 of which rotate wheels 26, running upon the table-top. In one of the slots 23 is placed a bar 27, the extremities of which are engaged by recesses 28 at the upper ends of the arms 19, thus supporting the end of the carriage opposite the wheels. From the upper side of the carriage are projections 29, adapted to enter the usual recesses present in the base of type-writers, there being such a machine indicated at T.

In this embodiment of my invention the counterweights are preferably so adjusted as to approximately neutralize the weight of the table-top and type-writer, so that it will remain in whatever position it is left. When the top is raised, the wheels of the carriage will lie at the extreme rear edge, the front of the carriage and the type-writer keyboard being raised above the top. This leaves the entire front clear to receive, for example, a train-sheet S, the particular form of the invention previously described being especially appropriate for use by train-despatchers employing a transmitting type-writer. When the operator wishes to use the machine, he simply draws the top toward him by its forward edge. As it advances the supporting-arms bring the type-writer toward the front to a point at which its keyboard may be conveniently manipulated. When so positioned, the carriage held projecting over the train-sheet conceals but little of it, leaving the remainder free for observation. Moreover, the carriage is held by the arms out of contact with said sheet, so that it may be slipped forwardly or to one side to bring its entire surface into view. When the operator is through using the machine, a rearward pressure against the edge of the top restores the apparatus to its original condition. To control the movement of the carriage to place it nearer to or farther from the user when it is forward, the bar or connecting member 27 may be placed in one or another of the slots in the carriage. As the contact of the top at the extremes of movement would tend to produce disagreeable noise and jar, I preferably cushion it by means of a cylinder or dash-pot 30, shown as pivoted to the front portion of the upper part of the frame and having operating in it a piston 31, the rod 32 of which is pivoted to the top near its rear portion. In the side wall of the cylinder is an opening 33, extending for a considerable portion of its length, this permitting the air to pass freely through it until the piston has reached the outer edge from the direction in which it is traveling. In each of the cylinder-heads is a contracted opening 34, controlled by a check-valve 35, opening inwardly. When the top is in either its raised or lowered position, the piston will be near one extremity of the cylinder and beyond the opening 33. During the first portion of the travel of the top the cushioning mechanism will allow its free movement, the air being expelled from the cylinder through the opening 33. When the piston passes this opening, however, it must move against the resistance of the air, thus opposing movement and bringing the parts to rest without undue concussion. Opposite travel causes the valve upon the head adjacent to the piston to open, avoiding the formation of a vacuum.

To avoid the necessity for placing objects upon the top, thus destroying the balance, I have shown standards 36 rising from the frame through slots in the top and carrying a shelf 37, which may support telegraph instruments I and any other articles which the operator wishes.

The table may be made partially automatic in action by employing the mechanism illustrated in Fig. 8. Here levers 38 38 are fulcrumed upon the under side of the top at 39 and are connected by a link 40, so that the swinging of one will cause its companion to move in the opposite direction. These levers are connected by a spring 41, drawing the ends farthest from the fulcra toward one another. Between the spring and the fulcra latch projections 42 are fixed to the levers at such points that they will engage the shelf-standards 36 when the carriage is in its rearward position. The outer end of each lever has a finger-piece 43, projecting through a slot 44 to a point above the table-top. In using this mechanism the counterweights are so adjusted that the carriage will be held normally in its forward position. It is locked in its rearward position by the engagement of the projections 42 with the standards. When the operator desires to use the machine, an outward movement of either of the finger-pieces will swing both levers to withdraw the latches from their coöperation with the standards, allowing the machine to assume its active position. Pressure against the table-top causes the backward travel of the carriage and machine.

In Figs. 11 and 12 another means for operating the table is shown. In this case a lever 45 is fulcrumed upon the frame at 46, it moving at its opposite end between the frame and a bar 47. It is connected by a flexible member, such as a cord 48, passing over guiding-sheaves 49, carried by the upper frame to an eye 50, depending from the top. Within the bar 47 it engages a latch projection 51, this serving to hold the top and carriage forward. To guide the lever in its vertical movement, and yet permit sufficient lateral play to provide for its engagement and disengagement with the latch projection, said lever passes between flexible members 52 52, secured at one extremity to an eye 53, supported by the bar 47, and having at their opposite extremity a spring 54, connected to said bar. These members keep the lever out of contact with the bar and frame, allowing it to move noiselessly in a substantially vertical direction, and yet to be swung laterally with respect to the latch. As in the previous instance, the counterweighting is such as to cause the table and carriage to automatically assume their rearward position, this following when the lever is released from the latch by the knee of the operator or otherwise. To bring the type-writer to its active position, it is only necessary to depress the lever by the hand until it is in engagement with the latch.

Instead of arms engaging the carriage a support or frame 55 may be provided, Figs. 9 and 10, hinged at 56 upon the upper side of the table-top and having at its outer side inclined ways 57. In these ways operate rolls 58, journaled upon the under side of a carriage 59, supporting the type-writer, as has been previously described. When the table-top approaches its forward extreme position, the frame 55 comes into contact with a roll 60, mounted upon the upper extremity of a standard 61, fixed to the frame and projecting through a slot 62 in the top. This causes the frame to be tilted upwardly about its hinge, which results in the carriage rolling toward the front of the table into the same position as is illustrated in Fig. 4, the diameter of the rolls 58 and the length of the vertical carriage members upon which they are rotatable being such that the type-writer will be normally supported for operation. When the top is restored by the operator to its original position, the frame 55 rises out of coöperation with the roll 60, causing the carriage to run back upon the ways.

In Fig. 14 a portion of a small table is shown adapted for the use of a telegraph operator or for general purposes. Here both the operating-shafts 63 may be continuous, and the cushioning mechanism, shelf, and standards are dispensed with. Otherwise the apparatus may be substantially the same as that first described.

Having thus described my invention, I claim as new and desire to secure by Letters Patent—

1. A table having a substantially horizontal top, means for mounting said top to swing forwardly and rearwardly in a horizontal position, a support for a machine above said top, and means for mounting said support to swing forwardly and rearwardly in a horizontal position simultaneously with said top.

2. A table having a substantially horizontal top, means for mounting said top to swing forwardly and rearwardly in a horizontal position, a support for a machine above said top and resting on said top, and means connecting said top with said support for swinging said support forwardly and rearwardly in a horizontal position and simultaneously with said top.

3. A table having a top, rock-shafts mounted on said table below said top, arms attached to said shafts and movably supporting said top, other arms mounted on one of said rock-shafts and projecting upwardly, and means for mounting a machine on said last-mentioned arms above said top.

4. A table having a swinging top with slots therein, fixed standards extending up through the slots, means for movably supporting a machine above said top, a shelf supported on said standards, and means for fixing said top with respect to said standards.

5. A table having a swinging top, rocker-arms mounted beneath said top and projecting upwardly, a machine supported on said arms at one side and supported on said table at the other side, and means for swinging said arms simultaneously with said top.

6. A table comprising a frame, shafts mounted in said frame, oscillatory arms carried by said shafts, a top attached to said arms and having openings, arms extending from one of said shafts through said openings, and means for supporting a machine on said last-mentioned arms above said top.

7. A table comprising a frame, shafts mounted in said frame, oscillatory arms carried by said shafts, a top attached to said arms and having openings, other arms extending from one of said shafts through the said openings, means for counterweighting said arms, and means for supporting a machine on said last-mentioned arms above said top.

8. In a table, the combination of a frame, a top mounted on said frame to move into different positions thereupon, said top being provided with slots extending therethrough, oscillatory arms mounted on said frame and projecting through said slots, and a machine-carriage movable upon said top and connected to said arms.

In testimony whereof I have signed my name to this specification in the presence of two subscribing witnesses.

ARTHUR P. SWITZER.

Witnesses:
SYLVANUS H. COBB,
JNO. M. RITTER.